US 8,093,845 B2

(12) United States Patent
Cheng

(10) Patent No.: US 8,093,845 B2
(45) Date of Patent: Jan. 10, 2012

(54) CONTROLLER AND MCU CHIP FOR CONTROLLING 3-PHASE BRUSHLESS DC MOTOR

(75) Inventor: Mao-Hsin Cheng, Zhubei (TW)

(73) Assignee: Padauk Technology Co., Ltd. (TW)

( * ) Notice: Subject to any disclaimer, the term of this patent is extended or adjusted under 35 U.S.C. 154(b) by 247 days.

(21) Appl. No.: 12/657,006

(22) Filed: Jan. 12, 2010

(65) Prior Publication Data

US 2010/0181953 A1    Jul. 22, 2010

(30) Foreign Application Priority Data

Jan. 21, 2009   (TW) .............................. 98102228 A

(51) Int. Cl.
*H02P 6/00*    (2006.01)
(52) U.S. Cl. ........... 318/400.01; 318/400.35; 360/73.03; 360/75; 360/67; 369/215.1; 369/44.34; 369/30.17
(58) Field of Classification Search .................. 318/400, 318/400.01, 400.35, 400.09, 632, 67, 560
See application file for complete search history.

(56) References Cited

U.S. PATENT DOCUMENTS

| 5,617,058 A * | 4/1997 | Adrian et al. ................... 330/10 |
| 6,922,100 B2 * | 7/2005 | Midya et al. .................... 330/10 |
| 7,573,218 B2 * | 8/2009 | Yu et al. .................... 318/400.25 |
| 2003/0174005 A1 * | 9/2003 | Latham et al. ................. 327/172 |
| 2004/0027760 A1 * | 2/2004 | Villaret ............................ 361/94 |

FOREIGN PATENT DOCUMENTS

EP    380456 A2 *    8/1990

* cited by examiner

*Primary Examiner* — Walter Benson
*Assistant Examiner* — Jorge Carrasquillo
(74) *Attorney, Agent, or Firm* — Tung & Associates

(57) ABSTRACT

The present invention discloses a 3-phase brushless DC motor controller, which comprises: a unit for generating a PWM signal; an ADC for converting a back electromotive force (BEMF) signal from an analog form into a digital form; a synchronization and extraction unit operating in synchronization in part with the PWM signal for extracting the digital BEMF signal to obtain a corresponding ZCP signal; and a unit for judging whether a commutation operation is to be performed according to a change of the corresponding ZCP signal. A wait instruction and a delay instruction help to accurately acquire the digital BEMF signal.

14 Claims, 7 Drawing Sheets

CONTROLLER AND MCU CHIP FOR CONTROLLING 3-PHASE BRUSHLESS DC MOTOR

BACKGROUND

1. Field of Invention

The present invention relates to a controller for a 3-phase brushless DC motor, and in particular to a controller for detecting a position of a rotor in a 3-phase brushless DC motor by sensor-less detection, in order to perform a commutation operation of the motor.

2. Description of Related Art

In driving a 3-phase brushless DC (referred to as BLDC, hereinafter) motor, a position of a rotor of the motor should be detected in order to perform the commutation. Basically, there are two methods for detecting the position of the rotor: with or without a sensor; the former is referred to as "sensor detection" and the latter is referred to as "sensor-less detection".

In sensor detection, since a position sensor is required, the sensor and the associated wiring and assembly greatly increase the cost and also consume space; the whole dimension of the motor package can not be reduced. In addition, while the position sensor is integrated with the motor, the reliability of the sensor may be adversely affected by high temperature, high pressure, and so on.

In view of the above problems of the sensor detection approach, the sensor-less detection is a better approach since it requires no position sensor. The sensor-less detection detects the position of the rotor, according to a back electromotive force (referred to as BEMF, hereinafter) induced when the motor is rotating. The BEMF is a terminal voltage induced in an unexcited (floating) winding by change of a magnetic field when the rotor of the motor is rotating. The information on the position of the rotor in the BLDC motor can be achieved by detecting a zero crossing point (referred to as ZCP, hereinafter) of the BEMF.

FIG. 4 illustrates a typical example of a power driver circuit 400 for a BLDC motor. As shown in FIG. 4, the BLDC motor may be driven in a desired phase sequence by turning on/off the sets of transistors $Q_{a+}$ and $Q_{a-}$, $Q_{b+}$ and $Q_{b-}$, and $Q_{c+}$ and $Q_{c-}$ to switch the power supply to different phases (phases A, B, and C) of the motor. The on/off operations of the transistor sets in the driver circuit 400 for the commutation operation are typically controlled by pulse width modulation (PWM) signals.

There are two types of PWM control schemes for the driver circuit 400: upper arm driving and lower arm driving. In the upper arm driving scheme, the switching devices $Q_{a+}$, $Q_{b+}$, and $Q_{c+}$ on the upper side are turned on/off under control of PWM signals, while the corresponding switching devices $Q_{a-}$, $Q_{b-}$, and $Q_{c-}$ on the lower side are fixedly connected to a negative power supply (for example, 0V). In the lower arm driving scheme, the switching devices $Q_{a-}$, $Q_{b-}$, and $Q_{c-}$ on the lower side are switched under control of PWM signals, while the corresponding switching devices $Q_{a+}$, $Q_{b+}$, and $Q_{c+}$ on the upper side are fixedly connected to a positive power supply (for example, +Vdc).

The ZCP and an operation for generating a ZCP signal will be described with reference to FIG. 2. FIG. 2 illustrates, by way of example, a waveform of the BEMF signal in a certain phase such as phase B when the motor operates in the lower arm driving scheme, and also illustrates a waveform of a corresponding PWM signal. In FIG. 2, PWM AL in the lower part of the figure denotes the waveform of the PWM signal (AL), which is used to control the lower arm power transistor $Q_{a-}$ for phase A in the driver circuit for the BLDC motor, and BEMF_B in the upper part denotes the waveform of the BEMF in phase B of the motor corresponding to the PWM signal. As shown in FIG. 2, transient states (noises) occur in the BEMF_B signal in correspondence to the falling edge and rising edge of each duty cycle of the PWM signal. Further, the BEMF_B signal is at low level but in a rising trend when the PWM signal is on, while it is high and remains constant when the PWM signal is off. The low level BEMF_B signal gradually rises to cross a zero crossing point (ZCP), which is (½)Vdc in FIG. 2. Therefore, the ZCP can be obtained by detecting the voltage value of the corresponding BEMF signal during the on-time of every PWM cycle. However, the transient states should be ignored so as not to cause any incorrect judgment in detecting the voltage value of the BEMF signal, because only the voltage level of the BEMF signal between transient states are meaningful. That is, in FIG. 2, a sampling operation for extracting the voltage value of the signal BEMF_B should be performed on the part of the signal BEMF_B after the transient state caused by the rising edge of the duty-on period and before the transient state caused by the falling edge of the duty-on period during every PWM cycle. The extracted value of the BEMF signal thus obtained is compared with a preset value so as to generate a ZCP signal. For example, a low level ZCP signal is generated when the BEMF value is less than the preset value, and a high level ZCP signal is generated when the BEMF signal value is greater than the preset value. The information of the position of the rotor can be obtained from a change of the phase of the generated ZCP signal (for example, a change from low level to high level).

FIG. 5 shows an example of a ZCP detection circuit 500 for detecting the ZCPs of BEMFs in 3 phases of a BLDC motor, according to prior art. The ZCP detection circuit 500 shown in FIG. 5 uses a hardware circuit to process the BEMF signals. The ZCP detection circuit 500 is provided with low-pass filters 506a, 506b, and 506c for filtering PWM chopping signals and commutation interference signals. However, because the low-pass filters cause phase delay and cannot completely filter the PWM chopping signals, it is likely to cause the succeeding comparison circuits 504a, 504b, and 50c4 to output incorrect comparison results, i.e., the incorrect ZCP signals, due to incorrect input signals. To eliminate such incorrect output results, a complicated hybrid PWM signal is required to control the switching operations in either the upper arm driving scheme or the lower arm driving scheme.

FIG. 6 shows an example of a 3-phase BLDC motor controller 600 according to the prior art, and FIG. 7 shows a comparison circuit used in the controller 600 for generating a ZCP signal by comparing a BEMF signal and a reference value. The controller 600 operates by sensor-less detection and it includes a control chip 602 to perform the control operation. In upper arm driving scheme, the controller 600 operates in synchronization with the off period of the PWM signal, and the comparison circuit shown in FIG. 7 compares the reference voltage and the BEMF signal to produce a ZCP signal. However, since the off period of the PWM is very short when the BLDC motor rotates in a high speed, and the transient states of the BEMF signals of the BLDC motor have a long settling time due to the high inductance of the motor, it is difficult to determine the sampling point for extracting a stable voltage value of the BEMF signal, and accordingly a correct ZCP signal for the BEMF may not be produced when the motor is rotating in a high speed. Therefore, the rotating speed of the motor is limited if an accurate control is desired. In the other case where the controller 600 operates in synchronization with the on period, the comparison circuit still may produce an incorrect ZCP signal when comparing the voltage of the BEMF signal and the reference voltage, because of the overshoots or undershoots of the BEMF signal.

Therefore, it is desirable to provide a controller that is able to reliably and correctly detect the ZCP even if the motor rotates in a high speed, and preferably without using any hardware comparison circuit.

SUMMARY

In view of the foregoing, it is desirous, and thus an object of the present invention, to provide a controller for controlling a 3-phase brushless direct current motor. The controller can highly efficiently and correctly detect zero cross points (ZCPs) of back electromotive forces (BEMFs) induced in respective phases, thereby to perform a commutation operation accurately.

In one aspect, this invention provides a controller for controlling a 3-phase brushless direct current motor, in which the motor operates in predetermined phase sequences, and the controller is capable of detecting a back electromotive force (BEMF) so as to produce a zero crossing point (ZCP) signal indicating a position of a rotor in the motor, thereby to perform a commutation operation for driving the motor. The controller comprising: a pulse width modulation (PWM) signal generation unit for generating a PWM signal, the PWM signal having a duty-on period; an analog to digital converter unit for performing an analog to digital conversion to convert the BEMF from an analog form into a digital form; an synchronization and extraction unit for extracting the BEMF in the digital form to obtain a corresponding ZCP signal; and an judgment unit for judging whether the commutation operation is to be performed according to a change of the ZCP signal, and outputting a commutation signal to the PWM signal generation unit after a predetermined time period if the commutation operation is determined to be performed, wherein the synchronization and extraction unit is adapted to operate in synchronization in part with the PWM signal such that the conversion by the analog to digital converter unit is delayed for a delay period from when the PWM signal switches to duty-on, the delay period being defined as $Td=T_{duty}-x$, where Td denotes the delay period, $T_{duty}$ denotes the duty-on period of the PWM signal, and x is not less than a time period required by the analog to digital converter unit to complete the conversion.

Preferably, the synchronization and extraction unit compares the BEMF in digital form with a ZCP reference value so as to produce the ZCP signal, the ZCP reference value being obtained from a maximum value of the BEMF in a phase sequence.

Preferably, a timer is provided which starts counting when the commutation operation is determined to be performed, and wherein the judgment unit outputs the commutation signal if a time count of the timer is equal to or greater than the predetermined time period.

Preferably, the synchronization and extraction unit is synchronized in part with the PWM signal when the PWM signal switches to duty-on by a wait instruction. The wait instruction causes the synchronization and extraction unit to remain in an idle state until a level corresponding to the PWM signal duty-on is detected. More preferably, a maximum duty-on period of the PWM signal is 100%.

Preferably, the analog to digital converter unit is delayed according to a delay instruction which causes the synchronization and extraction unit not to execute any instruction until the delay period expires.

The controller according to the present invention may be implemented with a single chip including a plurality of processors, also called as the multi-microcontroller unit (MMCU) chip. The various units in the controller may be implemented with independent processors, respectively. The MCU chip can generate a wait instruction and a delay instruction. The wait instruction instructs a processor in the chip to remain in the idle state until a predetermined level of a specified signal is detected. The delay instruction instructs a processor in the chip not to execute any instructions until the delay period expires.

According to the present invention, by synchronization with the PWM signals, and also by means of the wait and delay instructions, a stable BEMF value without any interference by transition states can be extracted, and accurate ZCP signals can be obtained thereby without using any complicated extra hardware circuit.

According to the present invention, it is required to obtain the ZCP reference values only once during a corresponding phase sequence, and this can be done without requiring for any extra hardware detection circuit. Further, since the ZCPs can be obtained in the duty-on period of the PWM signal regardless of the length of the duty-on period, the maximum duty ratio of the PWM signal can be 100%, that is, the rotating speed of the motor will not be limited. And furthermore, since each of the phase sequences can be switched precisely so that no phase sequence is missed, the motor can be driven in high efficiency.

The controller of the present invention can be implemented with a single chip; in comparison with prior art, many hardware circuits can be eliminated. Thus, the pin number of such chip can be remarkably reduced, and the cost as well.

These and other objects, technical contents, features and the achieved effects of the present invention will become better understood from the following description with reference to the accompanying drawings.

DESCRIPTION OF THE PREFERRED EMBODIMENTS

In the following description, embodiments of the present invention will be explained with reference to the accompanying drawings.

In general, a 3-phase BLDC motor operates in predetermined phase sequences. During each of the phase sequences, the voltage supplied to a specified phase of the motor is controlled by a PWM signal so that the voltage switches between a high level and a low level. It is critical for a 3-phase BLDC motor controller to control a commutation timing accurately and precisely so that the operation of the motor can be changed from a phase sequence to a next phase sequence in a predetermined order. The commutation timing can be determined accurately according to a ZCP of a BEMF signal produced in a phase of the 3-phase BLDC motor.

Figure 1:
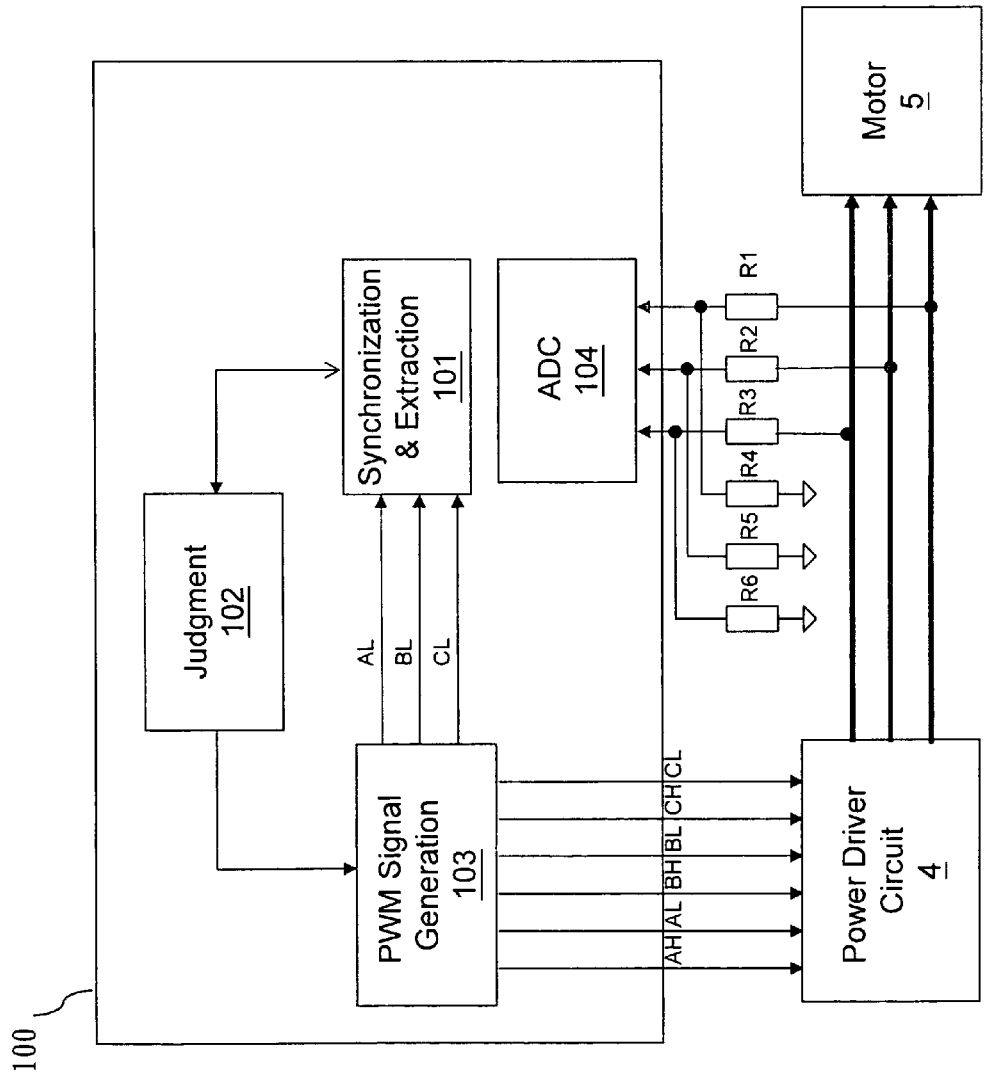
FIG. 1 is a block diagram showing an architecture of a BLDC motor controller according to an embodiment of the present invention.

FIG. 1 is a block diagram showing a BLDC motor controller 100 according to an embodiment of the present invention. The BLDC motor controller 100 can accurately and quickly detect a change of a ZCP so as to perform a commutation operation efficiently and accurately.

Figure 4:
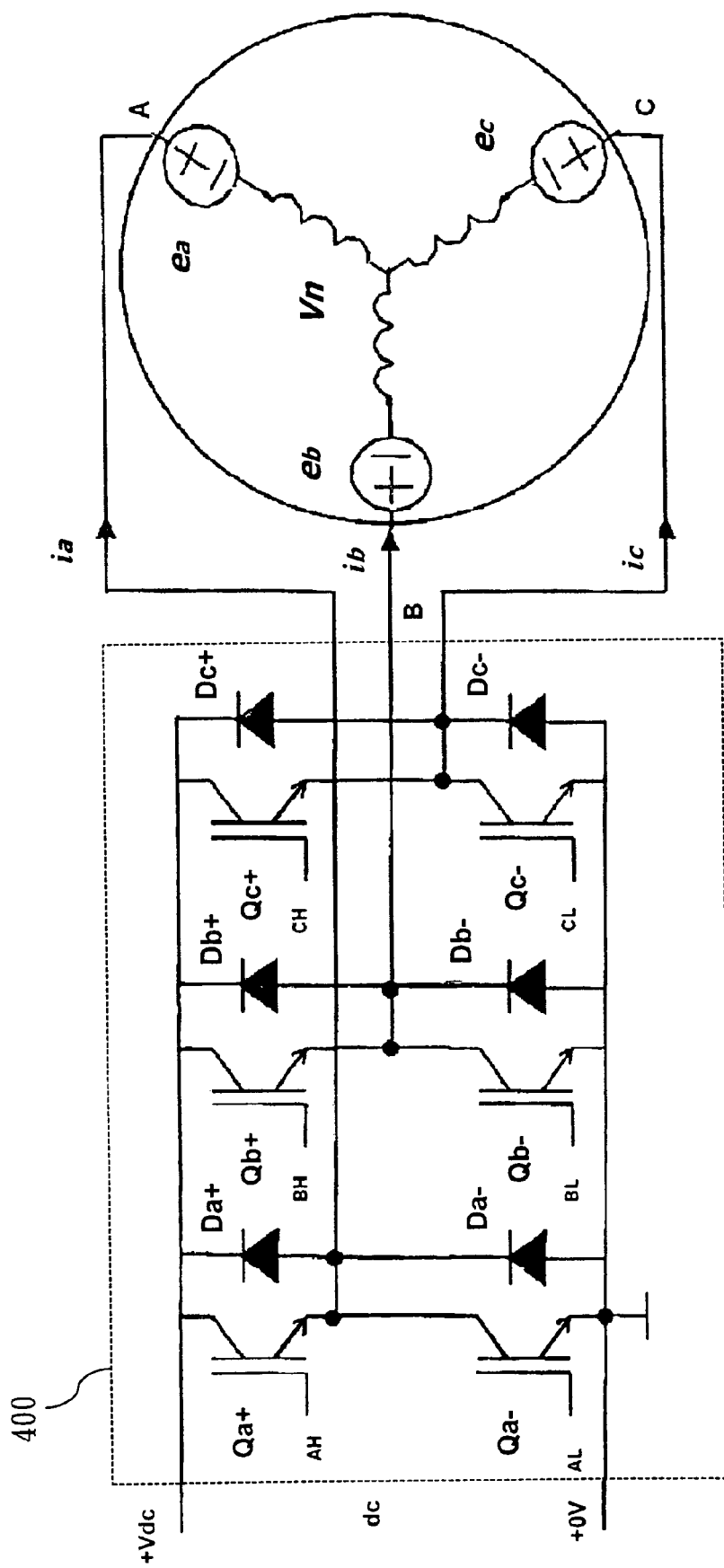
FIG. 4 shows a typical example of a power driver circuit used for a BLDC motor.
Figure 5:
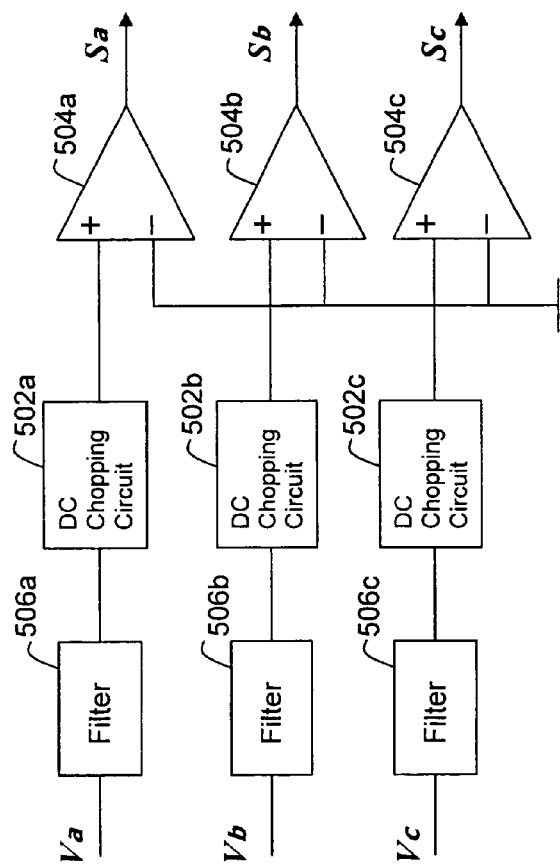
FIG. 5 shows an example of a ZCP detection circuit 500 for a BLDC motor according to the prior art.
Figure 6:
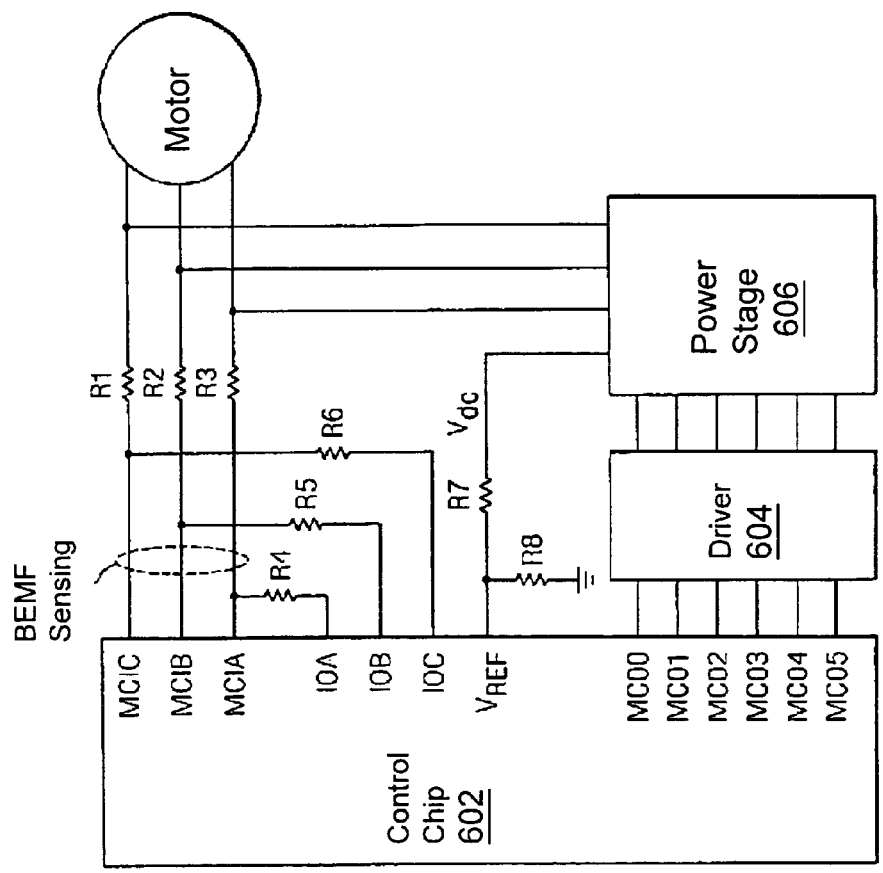
FIG. 6 shows an example of a BLDC motor controller according to the prior art.
Figure 7:
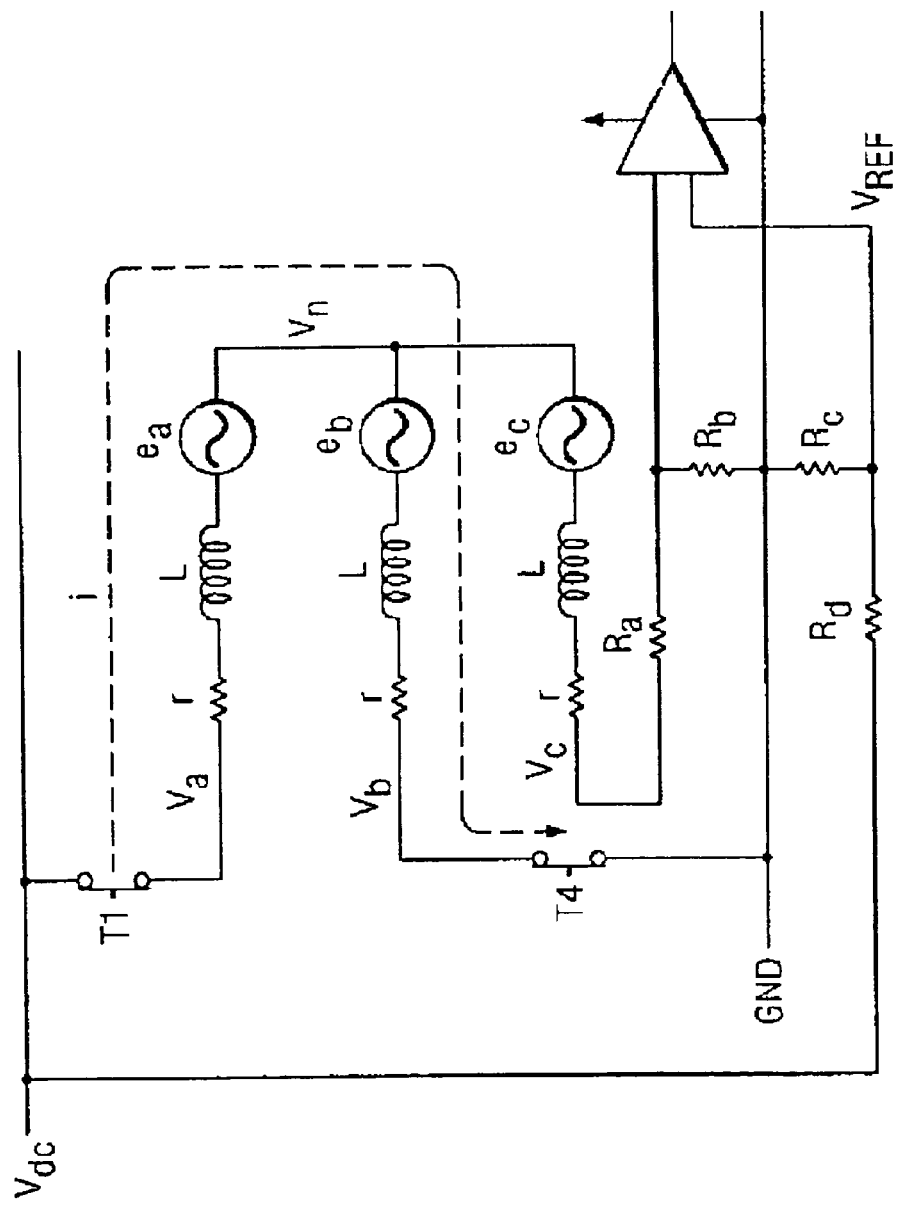
FIG. 7 shows a comparison circuit used in the controller shown in FIG. 6 for producing a ZCP signal by comparing a BEMF signal and a reference value.

As shown in FIG. 1, the controller 100 according to the embodiment of the present invention includes a synchronization and extraction unit 101, a judgment unit 102, a pulse width modulation (PWM) signal generation unit 103, and an analog to digital converter (ADC) 104. Although it is shown in FIG. 1 that the ADC 104 is inside the controller 100, this invention is not limited to this arrangement and the ADC 104 may be provided outside the controller 100. Although, for simplicity, it is also shown in FIG. 1 that the ADC 104 is not connected to any other unit or circuit inside the controller 100, in practice, it can be connected to at lease one of the units in the controller 100 for communication depending on designs. A BLDC motor 5 and a power driver circuit 4 is also shown in FIG. 1; the power driver circuit 4 for example may be the same as the power driver circuit 400 shown in FIG. 4.

Note that according to this embodiment, the controller 100 may be implemented with a multi-microcontroller unit (MMCU) chip. In other words, the controller 100 is implemented with a single chip having multiple different processors integrated therein. For example, the synchronization and extraction unit 101, the judgment unit 102, and the PWM signal generation unit 103 may be implemented with three independent processors of one MMCU chip, respectively. According to this embodiment, the MMCU chip is provided with wait instructions such as Wait0 and Wait1, and a delay instruction such as Delay. The wait instructions cause a processor to stop executing any instruction until a signal to be detected changes to a designated level. For example, the instruction Wait0 AL (or Wait1 AL) indicates that the processor must wait until the signal AL changes to 0 (or 1) before it executes any further instruction. As another example, the delay instruction causes a processor not to execute any instruction for a preset period, and resume its execution after the preset period expires.

Figure 2:
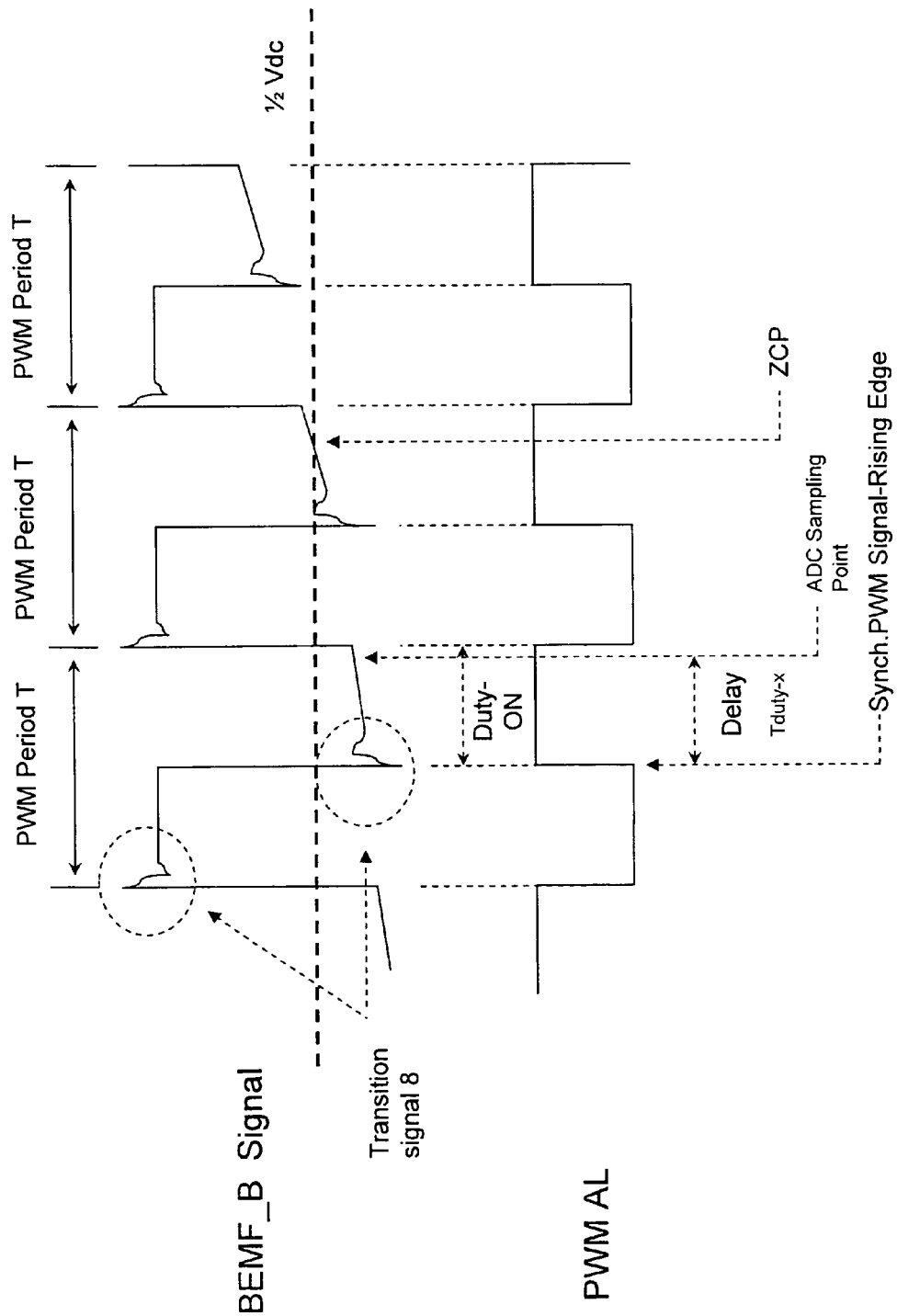
FIG. 2 shows the waveforms of a BEMF signal and a corresponding PWM signal for explaining an operation for producing a ZCP signal.

Hereinafter the operations of the controller 100 according to this embodiment will be described in detail with reference to FIGS. 1, 2, and 3. In the following description, it is assumed that the power driver circuit operates in the PWM lower arm driving scheme, but this invention is not limited to this and the same spirit may be applied to the power driver circuit operating in the PWM upper arm driving scheme.

As described in the section "Description of Related Art", in order to extract an accurate voltage value of the BEMF signal, the BEMF signal should be sampled at timings where no transient states are present during the duty-on period of the PWM signal, so that a correct ZCP signal can be obtained.

Figure 3:
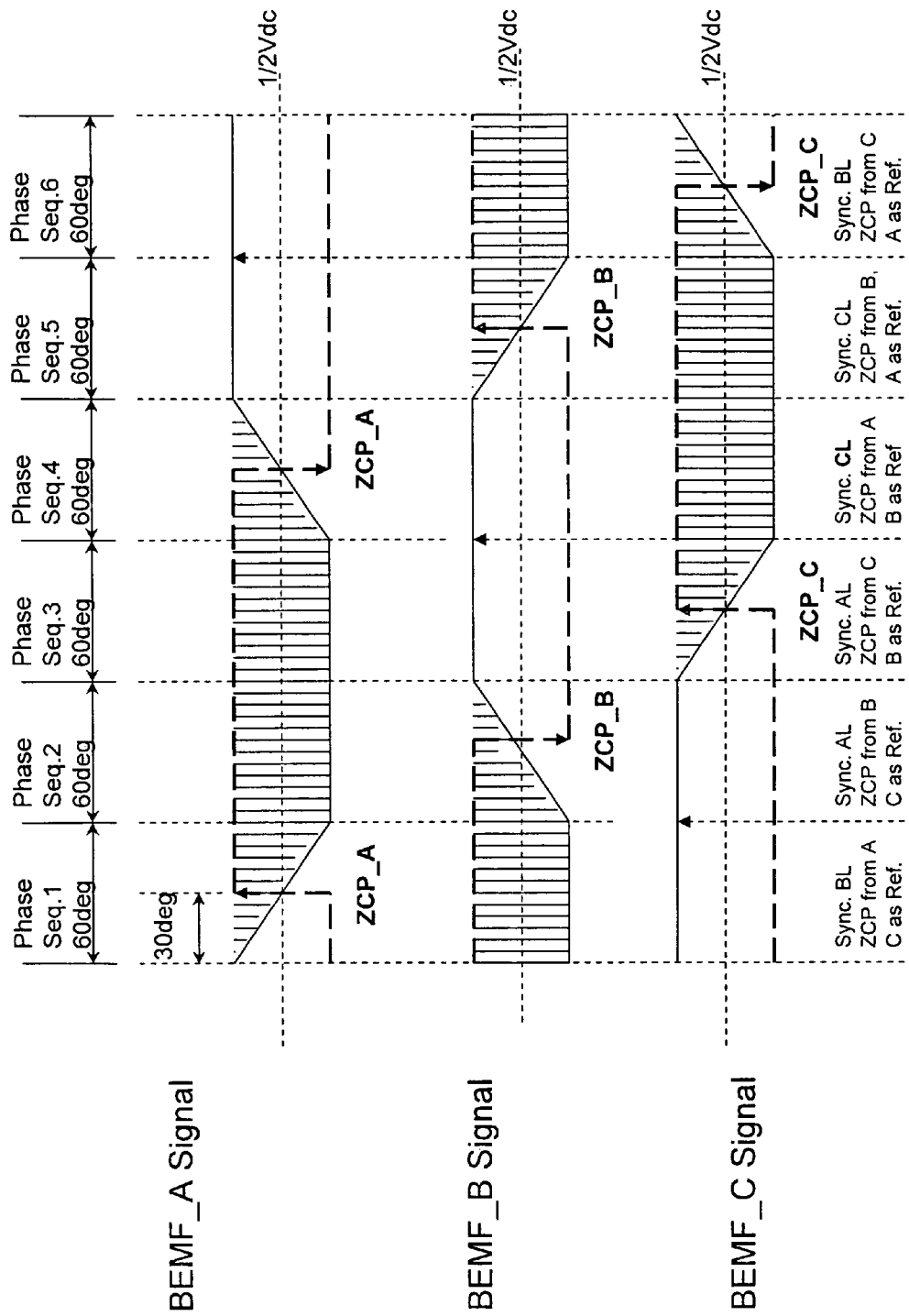
FIG. 3 shows waveforms of BEMF signals induced in respective phases of a 3-phase BLDC motor during respective phase sequences.

FIG. 3 shows the waveforms of the BEMF signals of a 3-phase BLDC motor according to phase sequences. More specifically, phase sequences 1, 2, 3, 4, 5, and 6 are illustrated in FIG. 3. During each of these phase sequences, PWM signals control the operation of the power driver circuit 4. FIG. 2 shows the waveform of one such PWM signal and a corresponding BEMF signal. In FIG. 3, the waveforms BEMF_A, BEMF_B, and BEMF_C indicated by solid lines denote the waveforms of BEMF signals in phases A, B, and C, respectively, and the waveforms ZCP_A, ZCP_B, and ZCP_C indicated by thick dash lines denote the waveforms of the ZCP signals for phases A, B, and C, respectively. As shown in FIG. 3, in the phase sequences, if the BEMF signal BEMF_A, BEMF_B, or BEMF_C is greater than a reference value such as $(½)V_{dc}$, then its corresponding ZCP signal is at low level (logic 0); otherwise, its corresponding ZCP signal is at high level (logic 1). Here, $V_{dc}$ is a positive voltage supply provided by the power driver circuit 4. Further, the remarks in the bottom part of each phase sequence indicate the operation status of the motor in the corresponding phase sequence. For example, in the phase sequence 2, the remarks "Sync. AL, ZCP from B, C as Ref." mean that the operation is to be synchronized with the PWM signal AL in phase A, to produce the ZCP signal from the BEMF signal BEMF_B, and to obtain a half of the voltage value of the BEMF signal BEMF_C in phase C as the reference value. (In the context of this specification, "synchronization" means to align in part or to align in a desired timing, but does not mean to be in complete coincidence.) Further, the ZCP signal in each phase sequence maybe represented in a binary form. For example, in the phase sequence 1, the ZCP signals of phases A, B, and C may be represented as "010" before the corresponding ZCPs, and as "110" after the corresponding ZCPs.

With reference to FIG. 1 again, the ADC 104 receives terminal voltages of the BLDC motor in respective phases, and converts these analog signals into digital signals and transmits them to the other units. The synchronization and extraction unit 101 extracts the digital BEMF values of the terminal voltages converted by the ADC 104. The judgment unit 102 determines the timing when the commutation operation should be performed according to the ZCP signal, determines which one of the PWM signals (AL, BL, and CL) in different phases to be synchronized with, and calculates a phase delay, etc. The PWM signal generation unit 103 generates and outputs a corresponding PWM signal AH, AL, BH, BL, CH, or CL according to a commutation control signal from the judgment unit 102.

The operation for producing a ZCP signal by the controller 100 according to the embodiment will be described below. The operation of the controller 100 in the sequence 2 shown in FIG. 3 is taken as an example. Here, the connection and relation between the phases A, B, and C of the motor and the power driver circuit may be the same as that shown in FIG. 4.

During the phase sequence 1 preceding the phase sequence 2, according to the change of the signals ZCP_A, ZCP_B, and ZCP_C, i.e., the change of the binary value of the ZCP signals ZCP_A, ZCP_B, and ZCP_C from "010" to "110" in phase sequence 1, the judgment unit 102 can predict the commutation timing for the next phase sequence (phase sequence 2) and which one of the PWM signals AH, AL, BH, BL, CH, and CL should be synchronized with in the next phase sequence, and sends the synchronization signal to the synchronization and extraction unit 101. According to this embodiment, the operations of the power driver circuit 4 corresponding to respective phases during each phase sequence are preset based on windings of the motor. As such, during the phase sequence 1, when the judgment unit 102 detects that the signal ZCP_A has changed, it will inform the synchronization and extraction unit 101 which phase PWM signal should be synchronized with during the next phase sequence 2. In this embodiment, it is predicted that the PWM signal AL is to be synchronized with. Then, the synchronization and extraction unit 101 executes the wait instruction such as Wait0 AL, and accordingly enters into an idle state until the level of the PWM signal AL changes to low level (0).

When the judgment unit 102 determines that the commutation operation should be performed during the phase sequence 1, a phase delay operation (described later) is first executed so that after the desired phase delay is fulfilled, a control signal is sent to the PWM signal generation unit 103 to cause it to output a desired PWM signal.

Upon entering the phase sequence 2, the PWM signal generation unit 103 generates and outputs PWM signal AL to the synchronization and extraction unit 101 and the power driver circuit 4 in order to control the commutation operation of the motor 5. At this time, the synchronization and extraction unit 101 can be accurately synchronized with a rising edge of the duty-on period of the PWM signal AL.

Then, the synchronization and extraction unit 101 executes the delay instruction such as Delay so that after expiration of a delay period $T_d$, the ADC 104 resumes to convert the analog BEMF signal BEMF_B of phase B into a digital signal and transmit it to the synchronization and extraction unit 101. In one embodiment, the delay period $T_d$ is set according to the following equation, so that the synchronization and extraction unit 101 can perform the sampling operation on the BEMF signal BEMF_F when the transient states caused by the rising and falling edges of the PWM signal are not present:

$$Td=T_{duty}-x, \text{ wherein } x \geq T_{ADC}$$

where $T_{duty}$ is the duty-on period of the PWM signal, x is a predetermined constant and $T_{ADC}$ denotes the processing time necessary for the ADC 104 to convert an analog signal into a digital signal, i.e., x is not less than a time period required by the ADC 104 to complete the conversion.

Although $T_{duty}$ varies with the rotating speed of the motor, because Td also varies with $T_{duty}$, and by means of the accurate synchronization with the PWM signal, and the wait instruction and the delay instruction, the synchronization and extraction unit 101 can accurately avoid the transient states to extract the most stable BEMF value before the falling edge of the PWM signal.

Subsequently, the synchronization and extraction unit 101 compares the extracted digital BEMF value and a ZCP reference value to produce a ZCP signal representing the ZCP information. For example, when the extracted value of the BEMF is less than the reference value, a high level is outputted; otherwise, a low level is output. The produced ZCP signal is transmitted to the judgment unit 102. In this embodiment, the ZCP reference value is (½) $V_{dc}$, but can be set otherwise. The operation for obtaining the ZCP reference value will be described below.

According to this embodiment, in any phase sequence, the synchronization and extraction unit 101 can obtain a ZCP reference value by detecting the BEMF voltage of an appropriate phase of the motor, without requiring for any extra hardware circuit. More specifically, the synchronization and extraction unit 101 can obtain the ZCP reference value by enabling the ADC 104 to extract the relatively stable analog BEMF signal and convert it into a digital signal in an appropriate phase sequence. For example, the values of the BEMF signal BEMF_C of phase C in the phase sequence 2, of the BEMF signal BEMF_B of phase B in the phase sequence 4, and of the BEMF signal BEMF_A of phase A in the phase sequence 6, which are the maximum and stable values of the BEMF signals of corresponding phases, are extracted as the ZCP reference values for corresponding phases, respectively. In addition, such operation for obtaining the ZCP reference value is executed only once during the corresponding phase sequence. Thus, according to the present invention, the controller can quickly and accurately obtain the ZPC reference value without requiring for any extra hardware circuit.

As described in the above, the synchronization and extraction unit 101 produces the ZCP signal ZCP_B and outputs it to the judgment unit 102. The judgment unit 102 determines the commutation timing for the next phase sequence according to the change of the signal ZCP_B. That is, when the judgment unit 102 judges that the signal ZCP_B changes to another level during the present phase sequence, the controller 100 switches to the next phase sequence.

Further, as shown in FIG. 3, the commutation timing for each phase is delayed by 30 electrical degrees in comparison with its corresponding ZCP signal. That is, the actual commutation is performed after a delay of about 30 electrical degrees from the time when the judgment unit 102 determines that the commutation is to be performed based on a detected level change of the ZCP signal. Such a delay can be achieved, for example, by means of a timer (not shown). When the ZCP signal changes, the judgment unit 102 keeps a record of the time interval (for example, 60 electrical degrees) of the preceding phase sequence and resets the timer. One half of the recorded time interval is used as the phase delay reference and it is compared with the time count of the timer. When the time count of the timer is equal to or greater than the phase delay reference, it is the timing to start the commutation operation. At this time point, the judgment unit 102 outputs a commutation signal, instructing the PWM signal generation unit 103 to output a corresponding PWM signal (AH, AL, BH, BL, CH, or CL) to the power driver circuit 4, driving the motor 5 to perform the commutation operation.

Thus, the commutation can be performed precisely after a delay of 30 electrical degrees because the judgment unit 102 can precisely activate the timer based on the change of the ZCP signal. In comparison with the prior art using low-pass filters which results in a varying delay period, this invention can perform the commutation operation much more efficiently, without missing any operation.

According to the present invention, the duty ratio of the PWM signal can be up to 100%, since the BEMF signals can be correctly detected to produce accurate ZCP signals during the duty-on period of the PWM signal, and this is achieved without requiring for any external hardware circuit. As such, the rotating speed of the motor does not have to be limited for the sake of correct detection and generation of the ZCP signals.

The operations of the controller of the present invention have been described with reference to the embodiment in the above. According to the present invention, by synchronization with the PWM signals, and also by means of the wait and delay instructions, a stable BEMF value without any interference by transient states can be extracted, and accurate ZCP signals can be obtained thereby without using any complicated extra hardware circuit. Moreover, according to the present invention, it is required to obtain the ZCP reference values only once during a corresponding phase sequence, and this can be done without requiring for any extra hardware detection circuit. Further, since the ZCPs can be obtained in the duty-on period of the PWM signal regardless of the length of the duty-on period, the maximum duty ratio of the PWM signal can be 100%, that is, the rotating speed of the motor will not be limited. And furthermore, since each of the phase sequences can be switched precisely so that no phase sequence is missed, the motor can be driven in high efficiency.

The controller of the present invention can be implemented with a single chip; in comparison with prior art, many hardware circuits can be eliminated. Thus, the pin number of such chip can be remarkably reduced, and the cost as well.

While the present invention has been explained with reference to certain preferred embodiments, the present invention is not limited to the specific details disclosed above. Various changes, modifications, alternatives, etc. may be made by those skilled in this art without departing from the spirit of the present invention. All such variations should be interpreted to fall within the scope defined by the appended claims and their equivalents.

What is claimed is:

1. A controller for controlling a 3-phase brushless direct current motor, said motor operating in phase sequences, said controller being capable of detecting a back electromotive force (BEMF) so as to produce a zero crossing point (ZCP) signal indicating a position of a rotor in said motor, thereby to perform a commutation operation for driving said motor, said controller comprising:
   a pulse width modulation (PWM) signal generation unit for generating a PWM signal, said PWM signal having a duty-on period;
   an analog to digital converter unit for performing an analog to digital conversion to convert said BEMF from an analog form into a digital form;
   an synchronization and extraction unit for extracting said BEMF in the digital form to obtain a corresponding ZCP signal; and
   an judgment unit for judging whether the commutation operation is to be performed according to a change of said ZCP signal, and outputting a commutation signal to said PWM signal generation unit after a predetermined time period if the commutation operation is determined to be performed,
   wherein said synchronization and extraction unit is adapted to operate in synchronization in part with said PWM signal such that the conversion by said analog to digital converter unit is delayed for a delay period from when said PWM signal switches to duty-on, the delay period being defined as $Td=T_{duty}-x$, where Td denotes the delay period, $T_{duty}$ denotes the duty-on period of said PWM signal, and x is not less than a time period required by said analog to digital converter unit to complete the conversion.

2. The controller as claimed in claim 1, wherein said synchronization and extraction unit compares the BEMF in digital form with a ZCP reference value so as to produce said ZCP signal, said ZCP reference value being obtained from a maximum value of the BEMF in a phase sequence.

3. The controller as claimed in claim 1, further comprising a timer which starts counting when the commutation operation is determined to be performed, and wherein the judgment unit outputs the commutation signal if a time count of the timer is equal to or greater than the predetermined time period.

4. The controller as claimed in claim 3, wherein the predetermined time period is equal to 30 electrical degrees.

5. The controller as claimed in claim 1, wherein a maximum duty-on period of said PWM signal is 100%.

6. The controller as claimed in claim 1, wherein said synchronization and extraction unit is synchronized in part with said PWM signal when said PWM signal switches to duty-on by a wait instruction which causes said synchronization and extraction unit to remain in an idle state until a level corresponding to said PWM signal duty-on is detected.

7. The controller as claimed in claim 1, wherein said analog to digital converter unit is delayed according to a delay instruction which causes said synchronization and extraction unit not to execute any instruction until the delay period expires.

8. A microcontroller unit chip for controlling a 3-phase brushless direct current motor, said motor operating in phase sequences, said controller being capable of detecting a back electromotive force (BEMF) so as to produce a zero crossing point (ZCP) signal indicating a position of a rotor in said motor, thereby to perform a commutation operation for driving said motor, said chip comprising:
   a pulse width modulation (PWM) signal generation unit for generating a PWM signal, said PWM signal having a duty-on period;
   an analog to digital converter unit for performing an analog to digital conversion to convert said BEMF from an analog form into a digital form;
   an synchronization and extraction unit for extracting said BEMF in the digital form to obtain a corresponding ZCP signal; and
   an judgment unit for judging whether the commutation operation is to be performed according to a change of said ZCP signal, and outputting a commutation signal to said PWM signal generation unit after a predetermined time period if the commutation operation is determined to be performed,
   wherein said synchronization and extraction unit is adapted to operate in synchronization in part with said PWM signal such that the conversion by said analog to digital converter unit is delayed for a delay period from when said PWM signal switches to duty-on, the delay period being defined as $Td=T_{duty}-x$, where Td denotes the delay period, $T_{duty}$ denotes the duty-on period of said PWM signal, and x is not less than a time period required by said analog to digital converter unit to complete the conversion.

9. The chip as claimed in claim 8, wherein said synchronization and extraction unit compares the BEMF in digital form with a ZCP reference value so as to produce said ZCP signal, said ZCP reference value being obtained from a maximum value of the BEMF in a phase sequence.

10. The chip as claimed in claim 8, further comprising a timer which starts counting when the commutation operation is determined to be performed, and wherein the judgment unit outputs the commutation signal if a time count of the timer is equal to or greater than the predetermined time period.

11. The chip as claimed in claim 10, wherein the predetermined time period is equal to 30 electrical degrees.

12. The chip as claimed in claim 8, wherein a maximum duty-on period of said PWM signal is 100%.

13. The chip as claimed in claim 8, wherein said synchronization and extraction unit is synchronized in part with said PWM signal when said PWM signal switches to duty-on by a wait instruction which causes said synchronization and extraction unit to remain in an idle state until a level corresponding to said PWM signal duty-on is detected.

14. The chip as claimed in claim 8, wherein said analog to digital converter unit is delayed according to a delay instruction which causes said synchronization and extraction unit not to execute any instruction until the delay period expires.

* * * * *